US012060742B2

(12) United States Patent
Wegner

(10) Patent No.: US 12,060,742 B2
(45) Date of Patent: Aug. 13, 2024

(54) METHOD FOR OPERATING A DOOR SYSTEM

(71) Applicant: dormakaba Deutschland GmbH, Ennepetal (DE)

(72) Inventor: Frank Wegner, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 75 days.

(21) Appl. No.: 17/668,081

(22) Filed: Feb. 9, 2022

(65) Prior Publication Data

US 2022/0268084 A1 Aug. 25, 2022

(30) Foreign Application Priority Data

Feb. 12, 2021 (EP) .................................... 21156788

(51) Int. Cl.
*E05F 15/73* (2015.01)

(52) U.S. Cl.
CPC ........ *E05F 15/73* (2015.01); *E05F 2015/767* (2015.01); *E05Y 2400/44* (2013.01); *E05Y 2900/132* (2013.01)

(58) Field of Classification Search
None
See application file for complete search history.

(56) References Cited

U.S. PATENT DOCUMENTS

| | | | | |
|---|---|---|---|---|
| 5,583,405 A * | 12/1996 | Sai | G01S 15/876 318/468 |
| 2018/0139378 A1* | 5/2018 | Moriuchi | G06T 7/571 |
| 2021/0254385 A1* | 8/2021 | Ishida | E05B 79/20 |

FOREIGN PATENT DOCUMENTS

| | | |
|---|---|---|
| DE | 20320497 U1 | 11/2004 |
| DE | 102019002397 A1 | 11/2019 |
| EP | 0696670 A1 | 2/1996 |

* cited by examiner

*Primary Examiner* — Thomas S McCormack
(74) *Attorney, Agent, or Firm* — CANTOR COLBURN LLP

(57) ABSTRACT

A method for operating a door system having a movable door leaf and a control unit, with at least one sensor unit being configured, with which the approach of at least one person is detected, includes: providing the sensor unit in the form of a radar sensor and/or a camera with an image processing unit; recording a distance of the person from the door system using the sensor unit; recording an approach speed with the sensor unit, at which the person approaches the door system; transmitting the distance and approach speed; determining a probable approach time of the person with the control unit; determining the movement parameters for moving the door leaf by the control unit and actuating the door leaf by the door actuator based on the movement parameters determined by the control unit. A door system having a control unit is configured to carry out this method.

13 Claims, 2 Drawing Sheets

METHOD FOR OPERATING A DOOR SYSTEM

CROSS-REFERENCE TO RELATED APPLICATIONS

This application is related to and claims the benefit of European Patent Application No. 21156788.8, filed on Feb. 12, 2021, the contents of which are herein incorporated by reference in their entirety.

TECHNICAL FIELD

The disclosure relates to a method for operating a door system, with the door system having a movable door leaf and a control unit for controlling a door actuator, with at least one sensor unit being configured, with which the approach of at least one person is detected. The disclosure also relates to a door system having a control unit which is designed to carry out the method according to the disclosure.

BACKGROUND

Door drives are known, which are connected to sensor units designed to detect people, for controlling automatic door systems, in particular sliding doors and swing leaf doors.

Thus, for example DE 203 20 497 U1 shows a door system having a door drive and having a sensor unit, with the sensor unit serving as a presence sensor and with which the presence of people can be detected in a detection area. When the person is detected, the opening of the door leaf of the door system is triggered via the door drive. In this case, it is indicated that radar sensors can also be used as sensor units. Disadvantageously however, only a single opening signal is generally generated by the control unit as soon as the sensor unit has detected the presence of a person. In this case, a door leaf movement can be triggered, but this often occurs too early or too late or is otherwise unsuitable, for example if the door leaf is moved with an excessively small or large opening angle.

The optimum in the control of door systems is in particular to enable the door system to be passed as comfortably as possible by the people, in particular without the people having to significantly change their movement direction and movement speed. On the other hand, when optimizing the control of a door system, it must also, however, be ensured not to guide a door leaf out of the closure position for longer than is necessary, in particular on cold days. In this case, it must be ensured that energy losses are avoided which result from door leaves being open for an unnecessarily long time and opening the door too often, too quickly, too wide and for too long can also progress the wearing of a door drive and therefore wearing of the door system more quickly than is necessary.

These disadvantages often result from the functioning of sensors of the sensor units which are not always reliable. It may for example happen that a person approaching a door system must interrupt the advancing movement if the door leaf opens too late as the sensor unit has detected the person too late. If the person has passed the door system, the door leaf should be prevented from closing too early if there is a further malfunction of the second sensor unit.

The difficulty with controlling the correct opening and closing times of the door leaf results, among other things, from the fact that the immediate region before the door system is not always recorded when using radar sensors in sensor units. A distant area is differentiated from a near area in the region before the door system in a manner known per se, with people being detected with the sensor units substantially only in the distant area, with the person in the near area being detected with further sensors, for example ultrasound sensors or optical sensors, to primarily protect closure edges of the door system.

However, in general, the opening and closing times as well as the opening hold period of the door leaf is determined based on the detection information of the sensor units which cover the distant areas, in particular if it concerns radar sensors, which are, however, not known for all door types. If a person passes a door system, then said person also passes through a shadow region (subsequent areas) between two detection regions of the sensor units (distant areas), which are mounted on opposing sides of the door system.

Automatic door systems are usually equipped with sensor units, which detect and evaluate approaching people and, if necessary, send a single opening signal to a control unit of the door actuator of the automatic door system. The sensor units operate based on infrared light, radar technology or with imaging technologies, such as a camera with assigned image evaluation system. The decision to transmit a signal to actuate the door, in particular thus to initiate an opening operation, is carried out by the sensor unit and each signal from the sensor unit results in an immediate opening of the door leaf of the automatic door system. The signal can be transferred as a single digital signal (0/1) or as a telegram via a data bus. In any case, however, it just concerns simple information which only serves to open the automatic door.

Since the sensor unit and the control unit are two autonomous systems, they must be adjusted to one another in order to achieve cooperation that is as seamless as possible.

The trigger threshold of the sensor unit for transmitting a signal to the control unit of the automatic door system is set on the sensor unit, the opening speed, opening hold time and opening width of the automatic door are set on the door controller to match this.

The optimal setting of both systems is identified by tests during the installation and is therefore specified once. Since two systems have to be set, this process is sometimes quite complex. Subsequent changes can be carried out, however, they are also complex since specialist personnel are required.

The trigger threshold of the sensor unit must be set such that all people who intend to pass the door system are reliably detected. The drive parameters of the door leaf of the automatic door must be set such that the door leaf opens in good time and remains open long enough so that the person can safely pass.

The people who wish to pass the door are very different. There are quick and slow people and people often come from different directions. All these parameters have to be considered for the settings. This leads to a compromise always being selected in the case of which the opening speed for the quickest person and the opening hold time for the slowest person are set. High opening speeds, however, apply to all opening operations which results in a high energy requirement for the drive. Long opening hold times increase the loads due to environmental influences, such as for example noise, dust, heat and cold and negatively affect the users and the energy requirement of the building.

SUMMARY

The disclosure improves a method for operating a door system, which in particular allows the opening hold period and the closing time of the door leaf to be determined such that the door leaf does not negatively affect the walking movement of the person passing the door system, with the door leaf also not leaving its closure position for longer than is necessary.

This is achieved by proceeding from a method according to the preamble of the claim 1 and also proceeding from a door system according to claim 13 each with the characterizing features. Advantageous further developments of the disclosure are each indicated in the dependent claims.

The method according to the disclosure comprises at least the following steps: providing the sensor unit in the form of a radar sensor and/or a camera with an image processing unit; recording a distance of the person from the door system by means of the sensor unit; recording an approach speed by means of the sensor unit, at which the person approaches the door system; transmitting the distance and the approach speed from the sensor unit to the control unit; determining a probable approach time of the person by means of the control unit; determining the movement parameters for moving the door leaf by means of the control unit and actuating the door leaf by means of the door actuator based on the movement parameters determined by means of the control unit.

The core idea of the disclosure is the improved control of the movement of the door leaf. The transfer of the decision, as to when the door leaf is opened, takes place from the sensor unit to the control unit in this case. The information transmitted by the sensor unit to the control unit no longer only relates to a single opening signal, but rather the information comprises at least the distance of the person and their approach speed.

Using the new method, the setting of the entire system is notably simplified, the energy consumption of the door drive in the door actuator reduced, energy losses of the building decreased and the load due to environmental influences lowered. Additionally, the load of the door actuator is lower which positively affects the wearing and therefore the service life.

The decision to open the door leaf is consequently transferred from the sensor unit to the control unit, while the sensor unit delivers the necessary information for making the decision. The sensor unit also detects the approaching people and, instead of a single opening signal, transmits the measured values of the approach speed and the distance of the approaching person to the control unit. The approach angle and an indication about the size or volume of the person can be optionally transferred to the door controller and leads to even better results.

The control unit decides on the basis of the values received from the sensor unit, when, at what speed and for how long the door will be opened.

In the case of quick people, an immediately quick opening with short opening hold time takes place, in the case of slow people, a later opening with longer opening hold time. In any case, the parameters are always calculated by the door controller on the basis of the transmitted values, with said parameters being optimally matched to the approaching person in order to keep the energy consumption of the drive, which is influenced to a great extent by the opening speed, as low as possible and the opening time of the door as short as is necessary.

By combining the values of the sensor unit mounted on the first outer side of the door system with a sensor unit mounted on an opposing second outer side, the system can also be optimized since, with increasing distance of the person after passing the door system, the door system can be closed without delay even if it has not yet opened fully to the maximum opening width. The energy consumption of the door actuator is reduced due to the now on average lower opening speed and, if applicable, smaller opening width. On average shorter opening times and, if applicable, smaller opening widths decrease the energy losses of the building and reduce the loads due to environmental influences.

Lower average drive speeds and, if applicable, opening widths reduce the load of the door drive, which, in addition to the positive effects on the service life, also increase the availability of the systems since overloads and therefore unpredictable failures occur less often.

The determination of the movement parameters for moving the door leaf by means of the control unit advantageously comprises an opening time, an opening speed and/or an opening hold period of the door leaf.

The probable approach time is determined at least from the distance of the person from the door leaf detected by the sensor unit and an approach speed detected by the sensor unit by means of the control unit based on the distance-time law according to ETA=d/v.

Additionally, in order to determine the probable approach time and the approach speed by means of the sensor unit, an approach angle can be determined at which the person approaches the door system and/or size information of the person can also be determined. As a result, it is possible to adapt the control of the door leaf even further to the walking behavior and the shape of the person.

It is also advantageous when the distance, the approach speed and/or the approach angle of the person is continuously recorded over preferably or substantially the entire time of the approach at least within the region of a distant field before the door system. As a result, corrections can be made for changes in speed and direction even after the person and their distance and speed is first recorded and measured. Substantially the entire time in this case describes at least 50% to 95% of the approach time from first recording to passing through the door system. The distant field is determined by the limits of the reliable recording of people by the sensor unit.

It is further advantageously provided that the approach time is at least stored in a volatile manner in the control unit of the door system in a memory and/or with the actual passage time of the person being recorded and/or calculated and/or the passage time forming the basis of the approach time stored in the memory.

A further advantage is achieved when the approach time of each person passing the door system is stored cumulatively and/or discretely such that the prediction of the approach time is continuously optimized based on the recording of the approach speed and/or the distance of the person from the door leaf. In this case, it is conceivable that the stored approach times are also deleted again after a predeterminable time. It is in particular advantageous when a roughly constant number of discretely stored approach times is stored in the memory of the control unit, particularly advantageously also in conjunction with the actually identified passage time in order to continue the continuous optimization.

Long opening hold times of the door leaf often result from opening hold times being set for unnecessarily long times on the control unit. The sensor evaluation according to the disclosure allows the pre-set opening hold time to be disregarded and therefore makes this setting unnecessary.

Advantageously, when a pivot movement of the door leaf is carried out, an interaction between the door leaf and the person is identified, with a correction value being determined for the pivot movement of the door leaf based on the interaction and future pivot movements of the door leaf being corrected by the correction value.

In this case, the correction values can be optimized in a correction value memory via an algorithm over the in particular initial service life of the pivot leaf door by the correction values for future pivot movements of the door leaf being defined in a prioritized manner such that the future number of interactions between the door leaf and the person entering the pivot leaf door is minimized.

Therefore, a learning door actuator can be provided which is continuously optimized by the learning property over the in particular initial service life at the point of installation. Therefore, it is possible to install a door system with factory standard settings at the point of installation without the controller having to be complexly adjusted to the operating conditions by a technician. The actuation of the door leaf is adjusted during the primarily initial service life of the door system by correction values being recorded and in particular stored from the interaction with the person entering and forming the basis for the actuation of future pivot movements of the door leaf. Consequently, the learning door actuator can configure and optimize itself in the course of its service life, in particular during the initial time until the interactions between the people entering and the door leaf reach a minimum. It is only then assumed that a certain satisfaction prevails concerning the movement behavior of the door leaf for the people entering, and the people entering the door system no longer interact with the door leaf. A thus identified optimum for the operation of the door system consequently forms the basis of the future operation of the door system.

To carry out the method, a sensor unit is in particular configured with which the at least one person is detected and with the door actuator having a control unit, with which information is received from the sensor unit about the presence and/or about the spatial distance and movement of people, with the pivot movement of the door leaf being carried out based on the information recorded by the sensor unit and also based on the correction value. The correction value can in particular be applied where the control unit controls the actual wiring of a drive unit in the door actuator. The correction values can therefore for example bring forward or delay the opening time of the door leaf, accelerate or slow down the opening speed of the door leaf or the angle position of the door leaf in the opening position can be configured to be enlarged or reduced. In the same way, the opening hold period, the closing speed and lastly also the response threshold of the door actuator can also be set when a person is detected by the sensor unit by the setting taking place through the automated optimization according to the disclosure.

Particularly advantageously, the control unit has a correction value memory in which correction values are stored. The correction values can be stored in the correction value memory, in particular cumulatively, preferably permanently, but at least in a volatile manner. It is also provided that the correction values are optimized in the correction value memory preferably via an algorithm over the in particular initial service life of the pivot leaf door by the correction values for future pivot movements of the door leaf being defined in a prioritized manner such that the future number of interactions between the door leaf and the people entering the pivot leaf door is minimized. When the algorithm is designed, the priority is consequently set for the correction values which generate as little interaction as possible between the people entering and the door leaf. Therefore, the optimum can be found via the algorithm itself, for which a number of correction values is stored for a longer time period, which are ultimately evaluated such that the correction values, which have generated a minimum of interactions between the person entering and the door leaf, form the basis of the future control of the door leaf.

The interaction between the door leaf and the person can take place in a different manner. For example, the interaction relates to a deliberate behavior of the person. Then, the interaction between the door leaf and the person can relate to an interruption, a slowing down and/or a stopping of the desired movement of the person just before the person passes through the pivot leaf door. It is also possible that the interaction relates to an acceleration of the walking movement of the person just before the person passes through the pivot door. Lastly, it is conceivable that the interaction between the door leaf and the person relates to a pushing of the opening movement of the door leaf. The pushing can be carried out during the opening movement or also in the opening position of the door leaf, for example if the door leaf opens either too slowly such that the person assists the opening movement, or the door leaf is not opened sufficiently wide in the opening position such that the person wants a greater opening angle and consequently pushes the door leaf into a further opening position.

According to a process-related further development of the method according to the disclosure, it can be provided that the correction value for the pivot movement of the door leaf is determined based on the interaction with a number of people in connection with the time of day and/or with the day of the week. Thus, correction values can also be provided which are stored depending on the time of day or depending on the day of the week. Furthermore, correction values can be made dependent on a difference between the inside and outside temperature of the building or correction values are made dependent on the season. Furthermore, wind loads, pressure differences between the inside and the outside of a building and/or sunshine can also form further parameters which are correlated with the correction values such that these further parameters also form the basis of the time-dependent or situation-dependent control of the pivot movement of the door leaf. If the people entering the door system, for example in the case of very low outside temperatures, regularly push the door leaf or hold it open manually or with their foot, then a weaker correction factor is formed than in the case of very high outside temperatures. The same can be provided in the case of wind loads, temperature differences and/or pressure differences between the inside region and the outside region of the building in which the door system is configured.

Furthermore, an exit time of the person can be determined on the second door side of a sensor unit, with the opening duration of the door leaf being determined from the identified exit time or the approach time, depending on which time is longer.

This also achieves the aim of better control of the door leaf since even after the person passes through the door system, it is ensured that the open position, after the person passes through the door system, lasts at least as long as the approach time of the person lasted. If the second sensor unit fails on the exit side of the door system, the door leaf remains open at least as long as the approach time such that it can be ensured that, for an assumed uniform movement of the person when passing the door system, the door leaf does not interrupt the person when they exit the door, the door leaf of a pivot leaf door in particular does not turn into the movement path of the person. If the approach time and the exit time are roughly the same, then the exit time can be used unchanged in the case of only a small deviation, for example 10% of the times between the approach time and the exit time. A comparison is made here preferably regularly, in particular for each entry.

The basis of the disclosure is primarily that the first and/or second sensor unit has a radar sensor, with which the approach speed and/or the distance of the person from the door leaf is recorded. Radar sensors allow not only the presence of a person to be detected, but can also identify the distance of the person, for example from the door system, and a radar sensor also allows an approach speed of a person to be identified. Furthermore, a radar sensor can detect whether a person moves towards the door system or whether the person moves away from the door system. Furthermore, a radar sensor can also record an approach angle at which a person approaches the door system. The detectable physical variables can be provided by the sensor unit during each entry to the door system for the entire entry time to the control unit of the door system in order to ultimately optimally control the movement of the door leaf. Therefore, one opening signal and, if applicable, one closing signal are no longer only emitted by means of the sensors, but rather a permanent provision of data by the sensor unit to the control unit takes place during the entire entry of at least one person to the door system.

The disclosure is also aimed at a door system having a control unit, which is designed to carry out the method described above. The door system can accordingly be designed as an automatic sliding door system, as a swing leaf door system or as a folding leaf door system.

The disclosure is also aimed at a computer program product for implementation in a control unit of a door system according to the above description, which is designed to carry out a method according to the above description.

Features and details, which are described in connection with the method according to the disclosure, also apply here in connection with the door system according to the disclosure and vice versa. In this case, the features listed in the description and in the claims may each be essential to the disclosure individually by themselves or in combination. Furthermore, a computer program product is being protected, which can be implemented in the control unit, with the features and advantages, which are listed above in connection with the method according to the disclosure, also being applicable to the computer program product.

BRIEF DESCRIPTION OF THE DRAWINGS

Further measures that improve the disclosure will be outlined in greater detail below together with the description of a preferred exemplary embodiment of the disclosure on the basis of the figures, in which are shown.

DETAILED DESCRIPTION OF THE DRAWINGS

Figure 1:
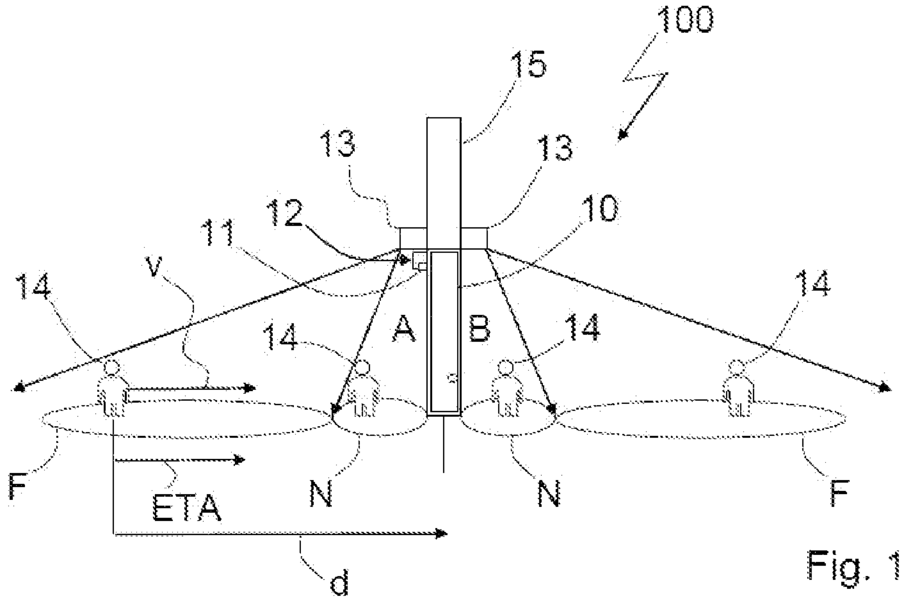
FIG. 1 a view of a door system with a person represented multiple times who approaches the door system and moves away from the door system again on the rear side, and FIG. 2 a schematic representation of a door system with two sliding door leaves and an approaching person.

FIG. 1 shows in a side view a door system 100 with a door leaf 10, which is arranged in a wall 15 so as to be movable. To actuate the door leaf 10, a door actuator 12 is used, which has a control unit 11, and the control unit 11 does not have to be a structural component of the door actuator 12, and the control unit 11 can also be arranged separately. The door actuator 12 can open and close the door leaf 10, with the door leaf 10 being represented closed in the arrangement shown.

On a first door side A, a first sensor unit 13 is used to monitor a first distant area F and on the second door side B, a second sensor unit 13 is used to monitor a second distant area F. The near areas N adjoining the door system 100 can, but must not necessarily, be monitored by the sensor units 13, which are designed as radar sensors here. The near areas N can be monitored by additional optical sensors or by ultrasound sensors, in particular incorporating closure edge monitoring.

In the image shown, a person 14 is drawn in multiple times, who moves towards the door system 100 from left to right on the first door side A and the person 14 shown moves away from the door system 100 on the second door side B.

If the person 14 now moves towards the door system 100 on the first door side A, then the first sensor unit 13 designed as a radar sensor measures the distance d and the approach speed v of the person 14 and a probable approach time ETA is determined from the distance d and the approach speed v of the person 14 relative to the door system 100. The probable approach time ETA is the time which the person 14 requires, from the position shown, to cross the door system 100 and the probable approach time ETA is calculated with the control unit 11.

The person 14 shown on the second door side B is detected by the second sensor unit 13 and an exit time ETD is also determined here with the recording of the distance of the person 14 and the exit speed from the door system 100.

The method according to the disclosure is designed here with the following steps: providing the sensor unit 13 in the form of a radar sensor and/or a camera with an image processing unit; recording a distance d of the person 14 from the door system 100 by means of the sensor unit 13; recording an approach speed v by means of the sensor unit 13, at which the person 14 approaches the door system 100; transmitting the distance d and the approach speed v from the sensor unit 11 to the control unit 11; determining a probable approach time ETA of the person 14 by means of the control unit 11; determining the movement parameters for moving the door leaf 10 by means of the control unit 11 and actuating the door leaf 10 by means of the door actuator 12 based on the movement parameters determined by means of the control unit 11.

Figure 2:
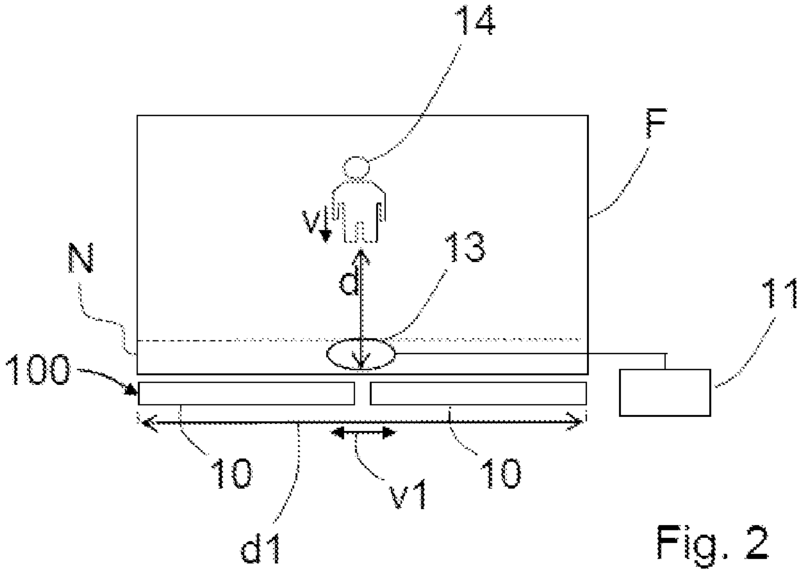

FIG. 2 shows a schematic plan view of a door system 100 and a person 14 is shown who approaches the door system 100 with two door leaves 10, designed as sliding door leaves, at the approach speed v from a distance d. The sensor unit 13 detects the approaching person 14 and the control unit 11 triggers the sliding movement of the door leaves 10 at a sufficiently short distance d taking into account the approach speed v. In this case, the following calculation is used:

The time to overcome the distance d is determined by $t=d/v$. The door leaves are moved for the door opening path $d1$ at the door opening speed $v1$ according to: $t1=d1/v1$.

Automatic swing leaf doors are often used in order to enable barrier-free access if the manual opening would be too difficult for impaired users. Servo or power assist functions are normally used, with the manual opening being assisted in a motorized manner by the door drive. However, these door systems are generally used by impaired people only to a small extent and predominately by unimpaired people. The latter use the door systems notably more dynamically and are in fact impeded by the motorized assistance since they open the door system more quickly than the motorized assistance permits or the additional manual acceleration leads to the door system not being able to be braked correctly in the end position.

The sensor unit transmits the approach speed of the person to the drive controller which then calculates and accordingly adjusts the strength of the motorized assistance as well as the required brake path. This allows the door to be used better by the different groups of people and to be braked in the end position to prevent damage.

The design of the disclosure is not restricted to the preferred exemplary embodiment indicated above. In fact, a number of variants is conceivable which make use of the solution represented even in the case of essentially different embodiments. All features and/or advantages emerging from the claims, the description or the drawings, including constructive details or spatial arrangements, may be essential to the disclosure by themselves and in the most varied combinations.

The invention claimed is:

1. A method for operating a door system, wherein the door system has a movable door leaf and a control unit for controlling a door actuator, wherein at least one sensor unit is configured, with which the approach of at least one person is detected, wherein the method includes the following steps:

providing the sensor unit in the form of a radar sensor, recording a distance (d) of the person from the door system by the sensor unit, recording an approach speed (v) by the sensor unit, at which the person approaches the door system, transmitting the distance (d) and the approach speed (v) from the sensor unit to the control unit, determining a probable approach time (ETA) of the person by the control unit, determining the movement parameters for moving the door leaf by the control unit, wherein the determination of the movement parameters for moving the door leaf by the control unit comprises an opening hold period of the door leaf, and actuating the door leaf by the door actuator based on the movement parameters determined by the control unit.

2. The method according to claim 1, wherein the probable approach time (ETA) is determined at least from the distance (d) of the person from the door leaf detected by the sensor unit and an approach speed (v) detected by the sensor unit by the control unit based on the distance-time law ETA=d/v.

3. The method according to claim 1, wherein in addition to determining the probable approach time (ETA) and the approach speed by the sensor unit, an approach angle at which the person approaches the door system and/or size information of the person are determined.

4. The method according to claim 1, wherein the distance (d), the approach speed (v) and/or the approach angle of the person is recorded continuously over the entire approach time at least within the region of a distant field before the door system.

5. The method according to claim 1, wherein the approach time (ETA) is stored at least in a volatile manner in the control unit of the door system in a memory and/or wherein the actual passage time of the person is recorded and/or calculated and/or the passage time forms the basis of the approach time (ETA) stored in the memory.

6. The method according to claim 1, wherein the approach time (ETA) of each person passing the door system is stored cumulatively and/or discretely such that the prediction of the approach time (ETA) is continuously optimized based on the recording of the approach speed and/or the distance of the person from the door leaf.

7. A method for operating a door system, wherein the door system has a movable door leaf and a control unit for controlling a door actuator, wherein at least one sensor unit is configured, with which the approach of at least one person is detected, wherein the method includes the following steps:

providing the sensor unit in the form of a radar sensor and/or a camera with an image processing unit, recording a distance (d) of the person from the door system by the sensor unit, recording an approach speed (v) by the sensor unit, at which the person approaches the door system, transmitting the distance (d) and the approach speed (v) from the sensor unit to the control unit, determining a probable approach time (ETA) of the person by the control unit, determining the movement parameters for moving the door leaf by the control unit, and actuating the door leaf by the door actuator based on the movement parameters determined by the control unit, wherein when a pivot movement of the door leaf is carried out, an interaction between the door leaf and the person is identified, wherein a correction value is determined for the pivot movement of the door leaf based on the interaction and future pivot movements of the door leaf are corrected by the correction value.

8. The method according to claim 7, wherein the correction values are optimized in a correction value memory via an algorithm over the in particular initial service life of the pivot leaf door by the correction values for future pivot movements of the door leaf being defined in a prioritized manner such that the future number of interactions between the door leaf and the person entering the pivot leaf door is minimized.

9. The method according to claim 1, wherein the interaction between the door leaf and the person relates to a deliberate behavior of the person, an interruption, an acceleration, a slowing down and/or a stopping of the walking movement of the person just before the person passes through the door system and/or in that the interaction between the door leaf and the person relates to a pushing of the opening movement of the door leaf.

10. A method for operating a door system, wherein the door system has a movable door leaf and a control unit for controlling a door actuator, wherein at least one sensor unit is configured, with which the approach of at least one person is detected, wherein the method includes the following steps:

providing the sensor unit in the form of a radar sensor and/or a camera with an image processing unit, recording a distance (d) of the person from the door system by the sensor unit, recording an approach speed (v) by the sensor unit, at which the person approaches the door system, transmitting the distance (d) and the approach speed (v) from the sensor unit to the control unit, determining a probable approach time (ETA) of the person by the control unit, determining the movement parameters for moving the door leaf by the control unit, and actuating the door leaf by the door actuator based on the movement parameters determined by the control unit, wherein an exit time of the person is determined on the second door side of a sensor unit, wherein the opening duration of the door leaf is determined from the identified exit time or the approach time (ETA), depending on which time is longer.

11. A door system having a control unit designed to carry out a method according to claim 1.

12. The door system according to claim 11, wherein the door system is configured as an automatic sliding door system, as a swing leaf door system, or as a folding leaf door system.

13. A non-transitory computer-readable medium storing a computer program for implementation in a control unit of a door system having a control unit configured to carry out a method according to claim 1.

* * * * *